(12) United States Patent
Pollack et al.

(10) Patent No.: US 8,366,352 B2
(45) Date of Patent: Feb. 5, 2013

(54) SYSTEM USABLE WITH A PIPE LAYING VESSEL

(75) Inventors: Jack Pollack, Monte-Carlo (MC); Denis Patrick Riordan, Houston, TX (US); David C. Riggs, Coppell, TX (US)

(73) Assignee: SBM Atlantia, Inc., Houston, TX (US)

( * ) Notice: Subject to any disclaimer, the term of this patent is extended or adjusted under 35 U.S.C. 154(b) by 634 days.

(21) Appl. No.: 12/527,073

(22) PCT Filed: Feb. 13, 2008

(86) PCT No.: PCT/IB2008/050525
§ 371 (c)(1), (2), (4) Date: Dec. 11, 2009

(87) PCT Pub. No.: WO2008/099355
PCT Pub. Date: Aug. 21, 2008

(65) Prior Publication Data
US 2010/0119307 A1 May 13, 2010

(30) Foreign Application Priority Data

Feb. 13, 2007 (EP) .................................... 07102292

(51) Int. Cl.
*F16L 1/15* (2006.01)
*F16L 1/235* (2006.01)
*B66F 11/00* (2006.01)
(52) U.S. Cl. ...................... 405/170; 405/166; 414/745.2
(58) Field of Classification Search .................. 405/166, 405/167, 168.1, 168.4, 169, 170, 184.4; 414/745.2
See application file for complete search history.

(56) References Cited

U.S. PATENT DOCUMENTS

| | | | |
|---|---|---|---|
| 3,860,122 A | 1/1975 | Cernosek | |
| 4,347,029 A | 8/1982 | Latimer et al. | |
| 6,213,686 B1 | 4/2001 | Baugh | |
| 6,910,848 B1 | 6/2005 | Baugh | |
| 2008/0277123 A1* | 11/2008 | Baross et al. ................. | 166/354 |

OTHER PUBLICATIONS

International Search Report dated Jul. 1, 2008, from corresponding PCT application.

* cited by examiner

*Primary Examiner* — Tara Mayo-Pinnock
(74) *Attorney, Agent, or Firm* — Young & Thompson

(57) ABSTRACT

A system usable with a pipe laying vessel, includes a support frame, such as a deck frame of the vessel, and a loader arm which is movable between a loading position and an upright position. The loader arm is provided with a pipe section manipulation system. A first clamping member is provided having a substantially fixed position with respect to the support frame. The first clamping member is operable between a clamped position for supporting the weight of the pipeline, and a released position for allowing the pipeline to be lowered. A second clamping member is movable between an upper position and a lower position. The second clamping member is operable between a clamped position for supporting the weight of the pipeline during movement from the upper position to the lower position, and a released position for moving the second clamping member from the lower position to the upper position.

18 Claims, 6 Drawing Sheets

SYSTEM USABLE WITH A PIPE LAYING VESSEL

BACKGROUND OF THE INVENTION

1. Field of the Invention

The invention relates to a system usable with a pipe laying vessel, comprising:
a support frame, such as a deck frame of the vessel,
a loader arm which is pivotable between a loading position and a laying position, which loader arm is provided with a pipe section manipulation system,
a first clamping member having a substantially fixed position with respect to the support frame, which first clamping member is operable between a clamped position for supporting the weight of a pipeline extending into the sea, and a released position for allowing the pipeline to be lowered with respect to the first clamping member,
a second clamping member being movable between an upper position and a lower position, which second clamping member is operable between a clamped position for supporting the weight of the pipeline during movement from the upper position to the lower position, and a released position for moving the second clamping member from the lower position to the upper position.

2. Description of the Related Art

A J-lay pipe laying vessel is known. The vessel has a J-lay tower and a loader arm that is pivotable with respect to the J-lay tower between a loading position and an upright position. In its loading position a pipe section is loaded from a pipe storage onto the loader arm, after which it pivots to the upright position adjacent to the J-lay tower. The J-lay tower comprises a system for manipulating the orientation of the pipe section. Thus, the pipe section is brought into alignment with a pipeline extending into the sea. The J-lay tower also has a fixed clamp and a moving clamp that can be operated according to the hand-over-hand principle by intermittently holding the pipeline by the fixed clamp and the moving clamp, respectively. The known J-lay tower is often relatively heavy and not suitable to easily retrofit existing vessels with J-lay equipment.

U.S. Pat. Nos. 6,910,848 and 6,213,686 disclose a system for laying a pipeline from a floating vessel onto the sea floor. This system comprises a J-lay tower with a pipeline extending below the J-lay tower around a bend and onto the sea floor. The J-lay tower has a mast, a working table and a travelling table. The working table and all parts attached to the working table including the mast can be gimballed. The travelling table has a clamp section for clamping the pipeline and can be moved between an upper and lower position. An erector is connected to the working table by a hinge. A new pipe section is loaded on the erector, which is provided with clamps for securing the pipe section to the erector. Then, the erector is pulled up to the mast of the J-lay tower by a cable. The mast of the J-lay tower is provided with a centralizer and a straightener. The centralizer is used to align the lower end of the new pipe section with the top of the pipeline for welding. The straightener can push the centre of the new pipe section while the upper and lower ends are restrained by the travelling table and the centralizer, respectively. Thus, this system comprises a J-lay tower and pivotable erector for loading pipe sections up to the mast of the J-lay tower. Transferring a pipe section from the erector to the J-lay tower is relatively complex.

BRIEF SUMMARY OF THE INVENTION

It is an object of the invention to provide an improved pipe laying system.

This object is achieved according to the invention by a system usable with a pipe laying vessel, comprising:
a support frame, such as a deck frame of the vessel,
a loader arm which is pivotable between a loading position and a laying position, which loader arm is provided with a pipe section manipulation system,
a first clamping member having a substantially fixed position with respect to the support frame, which first clamping member is operable between a clamped position for supporting the weight of a pipeline extending into the sea, and a released position for allowing the pipeline to be lowered with respect to the first clamping member,
a second clamping member being movable between an upper position and a lower position, which second clamping member is operable between a clamped position for supporting the weight of the pipeline during movement from the upper position to the lower position, and a released position for moving the second clamping member from the lower position to the upper position,
and the pipe manipulation system of the loader arm is adapted for manipulating a lower end of a pipe section which is loaded on the loader arm into alignment with an upper end of the pipeline extending into the sea in the laying position of the loader arm.

As a result, the loader arm is able to function as a pipe loader and a tower at the same time. The pipe section is loaded from a pipe storage onto the loader arm in its loading position. Then, the loader arm is erected to its laying position, i.e. upright position, while the pipe manipulation system of the loader arm holds the pipe section in place. For example, the pipe manipulation system comprises grippers for engaging the pipe section. In the erected, laying position of the loader arm, the pipe manipulation system of the loader arm is able to align the lower end of the pipe section with the upper end of the pipeline extending into the sea, e.g. the pipe section is accurately mated-up and lowered onto the pipeline. In the prior art, the loader arm is not suitable for such manipulation, and the alignment of the pipe section with the pipeline is made by a pipe manipulation system of a separate J-lay tower.

When the lower end of the pipe section rests on the upper end of the pipeline extending into the sea, these ends can be connected to each other, for example by welding. Thus, the loader arm according to the invention in its erected laying position constitutes a J-lay tower. It is not necessary to transfer the pipe section to a separate J-lay tower and a conventional J-lay tower separate from the loader arm is omitted according to the invention.

The clamping members can subsequently be operated according to the hand-over-hand principle: the previously launched pipeline is clamped by the movable second clamping member in the upper position while the pipeline is supported by the first clamping member having a substantially fixed position. The first clamping member is released and the movable clamping member and the pipeline are lowered to the lower position. In the lower position, the first clamping member is operated into the clamped position for supporting the pipeline extending into the sea. Then, the movable second clamping member is released and moved back to its upper position. The first clamping member is then operated to again hold the pipeline near the upper end of the pipe section just connected to the pipeline. As a result, the extended pipeline, i.e. with the attached pipe section, is lowered with respect to the erected loader arm.

In an embodiment of the invention, the movable second clamping member in the upper and lower positions is located below the first clamping member having a substantially fixed position. Thus, the movable second clamping member does not have to be integrated within the loader arm, but it can be mounted in a separate structure being displaceable below the support frame and loader arm. Thus, the weight of the loader arm constituting a pivoting J-lay tower can be kept relatively low. Also, the loader arm design remains relatively simple—it is not necessary to devise a complex structure for including the movable second clamping member into the loader arm. This results in a simple and lightweight construction of the loader arm.

It should be noted however that it is also possible according to the invention that the movable second clamping member is installed onto the loader arm, i.e. the loader arm comprises the second clamping member and a driving mechanism for moving it between its upper and lower positions. In this case, the movable second clamping member is mounted above the first clamping member having a substantially fixed position.

In an embodiment of the invention, the movable second clamping member, at least in its lower position, is located below sea level during operation. As a result, the movable second clamping member is operated under water in its lower position. The movable second clamping member may also be under water in its upper position.

In an embodiment of the invention, the system comprises a subsea elevator unit, which is provided with the second clamping member, wherein the subsea elevator unit is movable between an upper position and a lower position, which upper and lower positions of the subsea elevator unit are located below the first clamping member having a substantially fixed position. In this embodiment, the second clamping member is mounted into a subsea elevator that can be displaced up and down as a separate unit below the first clamping member of the loader arm. The upper and lower positions of the subsea elevator unit correspond to the upper and lower positions of the movable second clamping member.

It is possible that the subsea elevator unit is connected to the support frame, for example by cables. A lifting system for moving the subsea elevator unit between its upper and lower positions may be provided, for example mounted on the support frame. The lifting system may comprise hydraulic cylinders and possibly multiple sheave blocks.

In an embodiment of the invention, the first clamping member can be operated into the released position only when the second clamping member is in the clamped position, and wherein the second clamping member can be operated into the released position only when the first clamping member is in the clamped position. As a result, the pipeline cannot be released accidentally.

In an embodiment of the invention, the loader arm is pivotably connected to the support frame so as to be substantially independent from sea-state induced vessel motions, in particular rolling and pitching. For example, the support frame comprises a gimbal device having an outer gimbal member that is pivotable about a first pivot axis with respect to the support frame, and an inner gimbal member that is pivotable about a second pivot axis with respect to the outer gimbal member, the second pivot axis being perpendicular to the first pivot axis, and wherein the loader arm is pivotably connected to the inner gimbal member.

It is possible that the loader arm is pivotable about the second pivot axis. In this embodiment, the inner gimbal member and the loader arm are pivotable about a common pivot axis. This leads to a simple construction.

Also, the system may comprise actuating means that are pivotably connected between the inner gimbal member and the loader arm, which actuating means are adapted for adjusting the orientation of the loader arm with respect to the vertical. The loader arm in its upright position abuts against the inner gimbal member via the actuating means. The actuating means can be operated to accurately control the orientation of the loader arm. Thus, the actuating means are adapted for bringing the loader arm carrying the pipe section to be attached to the pipeline into alignment with the pipeline. For example, the actuating means comprise one or more hydraulic actuators.

The invention also relates to a vessel comprising a system as described above.

Furthermore, the invention relates to a method for installing a pipeline onto a sea bed, comprising:

providing a support frame, such as a deck frame of a vessel, providing a pipeline extending into the sea, which pipeline has an upper end that is clamped by a first clamping member for supporting the weight of the pipeline, loading a pipe section onto a loader arm in a loading position, and holding said pipe section on the loader arm, pivoting the loader arm from the loading position to a laying position, manipulating the pipe section on the loader arm in the laying position such that the lower end of the pipe section is lowered into alignment with and/or onto the upper end of the pipeline extending into the sea, attaching the lower end of the pipe section to the upper end of the pipeline so as to extend the pipeline extending into the sea by the pipe section, clamping the extended pipeline extending into the sea, i.e. with the attached pipe section, by a second clamping member in an upper position for supporting the weight of the extended pipeline, releasing the first clamping member, moving the second clamping member from the upper position to a lower position.

It should be noted that the attachment of the pipe section to the pipeline can be accomplished in various ways. For example the attachment may include welding, screwing, force-fitting, and any other suitable attachment operation.

It is possible according to the invention that the first clamping member is operated to clamp the extended pipeline after the second clamping member has been moved to its lower position, and wherein the second clamping member is released after clamping the extended pipeline by the first clamping member, and the second clamping member is subsequently moved back from its lower position to its upper position. The first clamping member has a substantially fixed position with respect to the support frame. Initially, it clamps the pipeline extending into the sea. After attaching the pipe section, for example by welding, the second clamping member in its upper position also engages the pipeline. When the first clamping member is subsequently released, the pipeline is lowered by moving the second clamping member from its upper position to its lower position. Then, the first clamping member is operated to clamp the upper end of the pipeline again, so that the second clamping member can be released and moved back up without engaging the pipeline. This operation is referred to as "hand over hand".

It is advantageous according to the invention that the second clamping member is moving from its upper position to its lower position below the first clamping member. Possibly, the second clamping member is moved below sea level, i.e. under water, at least in its lower position. When the stroke of the movable second clamping member is located below the first clamping member, the movable second clamping member does not have to be incorporated into the loader arm which is also functioning as a tower. Thus, the loader arm design remains relatively simple.

BRIEF DESCRIPTION OF THE DRAWINGS

The invention will now be explained, merely by way of example, with respect to the accompanying drawings.

DETAILED DESCRIPTION OF THE PREFERRED EMBODIMENTS

Figure 1:
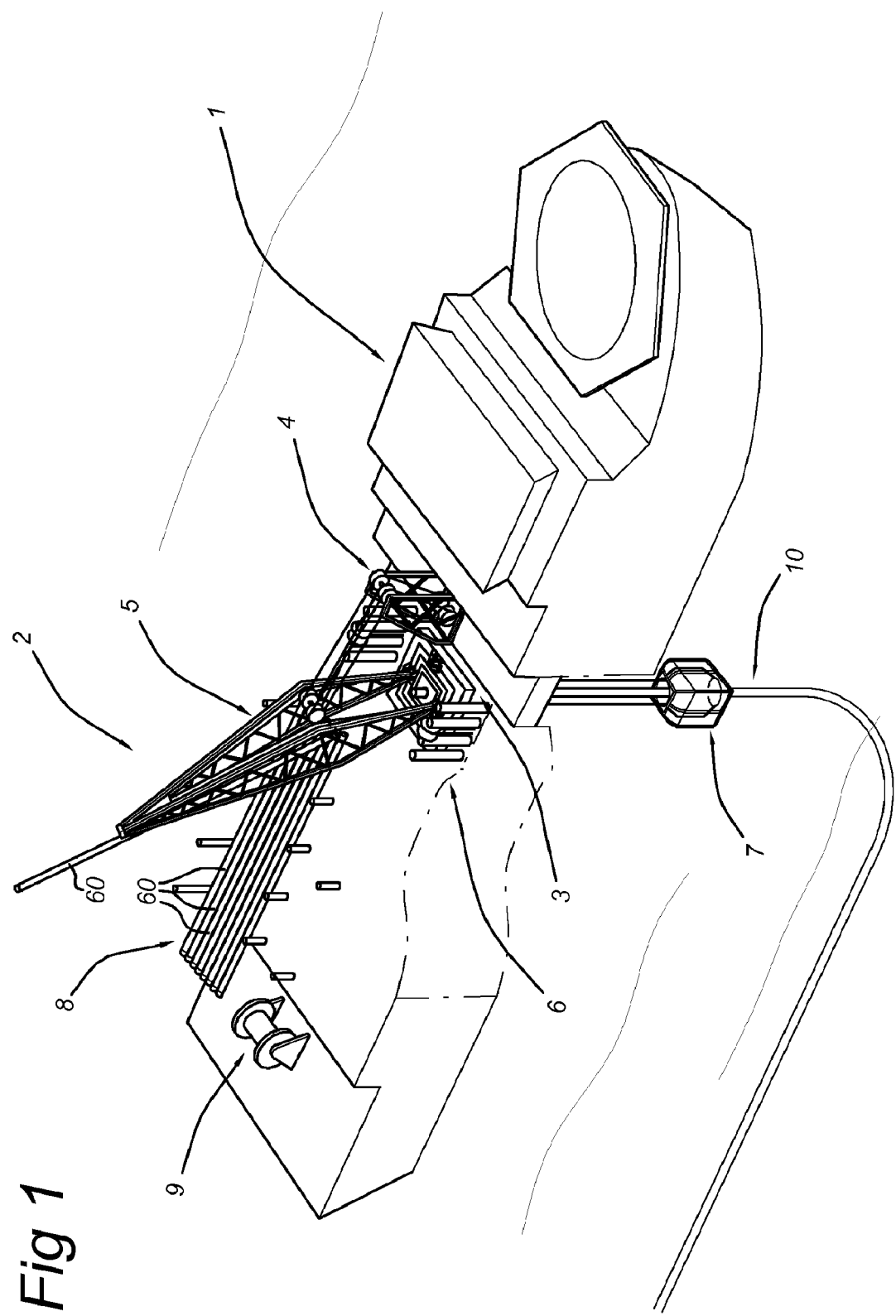
FIG. 1 shows a vessel provided with a system for laying an offshore pipeline.

The vessel for laying an offshore pipeline shown in FIG. 1 is denoted in its entirety by 1. The vessel 1 comprises a system 2 for vertical or near vertical laying an offshore pipeline 10. The pipeline 10 runs down from the vessel 1 onto the sea floor with a single bend. The system 2 is a J-lay system, which is especially advantageous for deep water pipe laying. In this exemplary embodiment the system 2 is capable of laying rigid pipe, e.g. having a diameter in the range of 8-24".

The J-lay system 2 is provided with a loader arm 5, e.g. having a weight of 60 t. The loader arm 5 is pivotable between a substantially horizontal, loading position and an upright, laying position. The loader arm 5 can be erected using a winch tower 4. The system 2 also has a subsea elevator (SSE) unit 7 (e.g. weight 50 t), which can be moved up and down with respect to the vessel 1 using a subsea elevator lifting system 6. Furthermore, the system 2 according to this exemplary embodiment comprises deck pipe handling equipment 8 and an abandonment and recovery system 9 (A&R system).

The J-lay system 2 allows pipe sections 60 loaded on the back deck of the vessel 1 to be lifted into a laying, upright position and jointed to the pipeline 10 extending into the sea. In this exemplary embodiment, the pipeline 10 is laid through the moonpool, but other locations for launching the pipeline 10 are possible, such as the stern or bow, or along a side of the vessel 1.

The J-lay system 2 may use standard types of pipe sections. For example, pipe may be insulated to a specification which allows friction clamping of the pipe sections and pipeline on the outer coating during the lay operation. The pipe may also be non-insulated such as water injection or oil offloading pipelines. In the case of non-insulated pipe, the pipeline may be deployed hand-over-hand by clamping onto an enlargement on the pipe such as a J-lay collar or connector collar.

The pipe sections may be provided with FRPC's (Fatigue Resistant Pipe Couplings) to gain maximum benefit from the rapid cycle lay time available with the J-lay system 2. Strake installation may be accommodated at the main working deck of the vessel 1 or beneath the gimbal table 3 with a coverage of approximately 85% of the designated pipeline lengths, leaving exposed pipe for friction or collar clamping members. The pipe sections may also be tendon pipes, such as those used on Tension Leg Platforms (TLP's).

Figure 2:
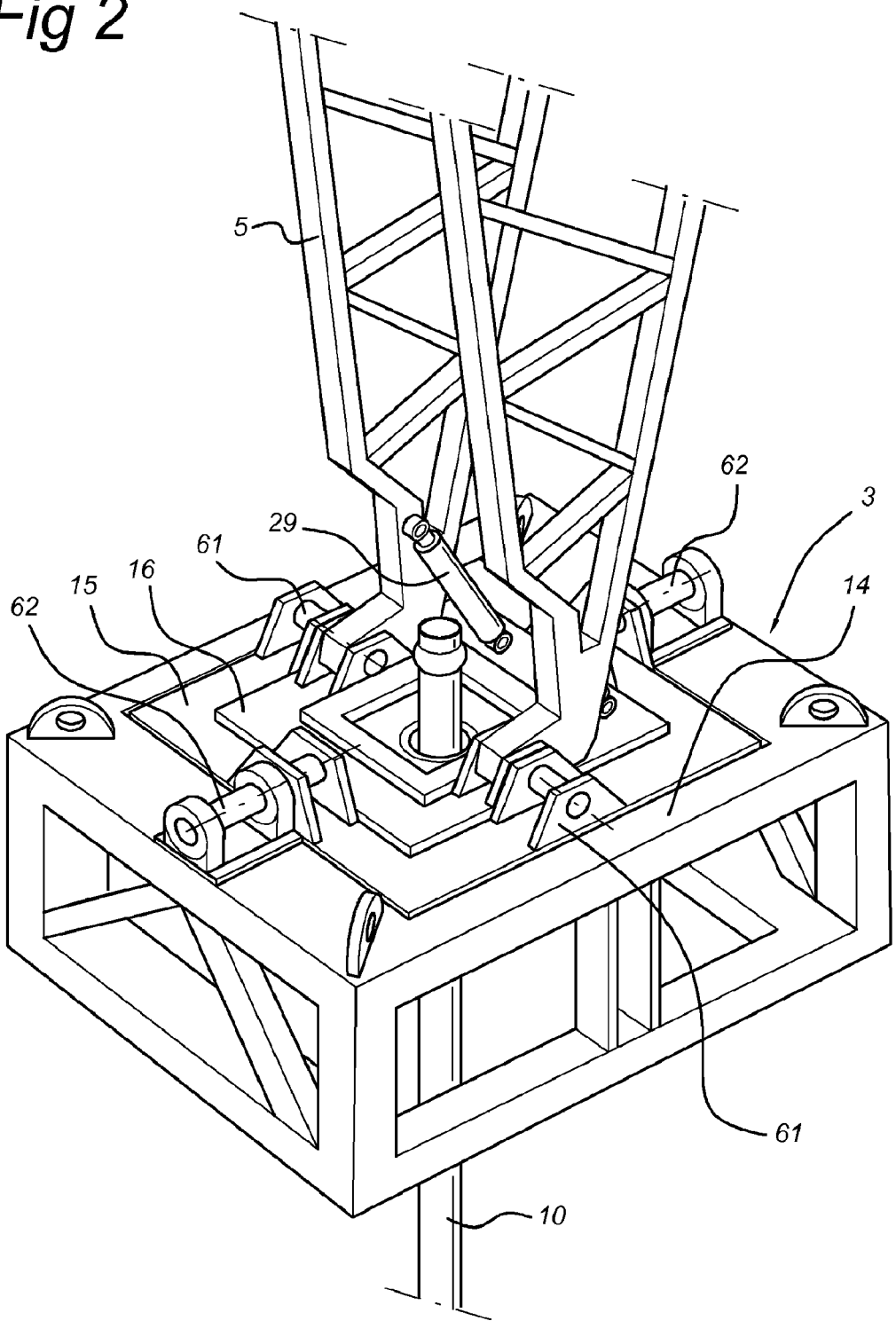
FIGS. 2, 3 show a gimbal device of the system shown in FIG. 1.
Figure 3:
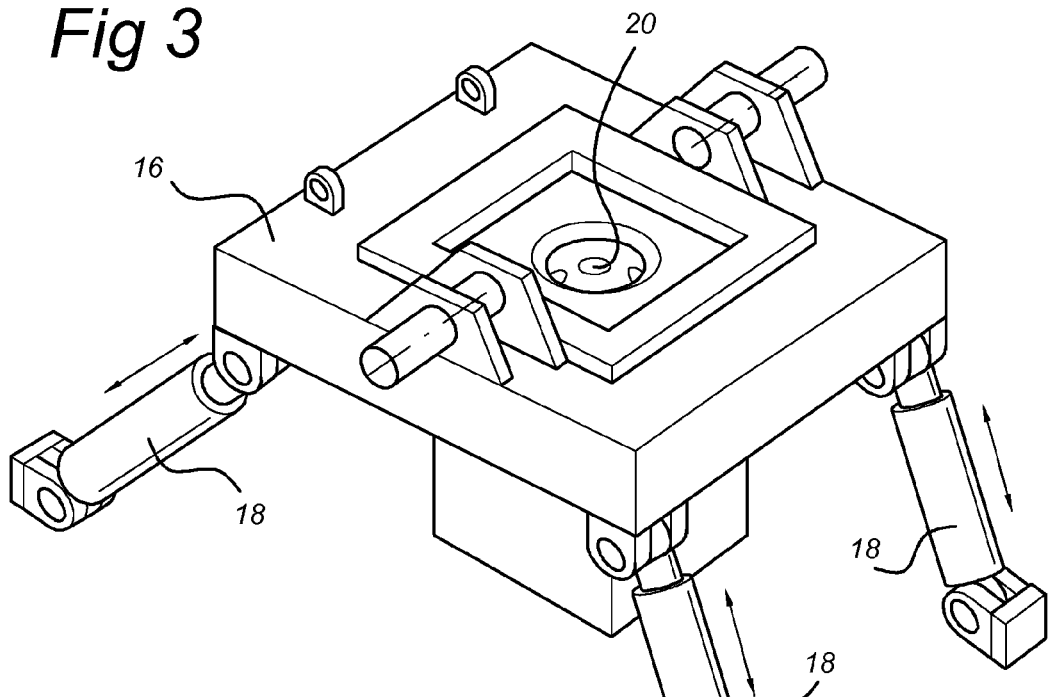

As shown in FIGS. 2 and 3 the J-laying system 2 comprises a gimbal device 3 for actively gimbaling the loader arm 5 of the J-laying system 2. The gimbal device 3 forms an active gimbal table which may be, for example, a large steel fabrication that is placed on the main ships deck around the moonpool. The gimbal table 3 may have a weight of 143 t.

The gimbal table 3 comprises a support frame, such as the deck frame 14, an outer gimbal member or table 15 and an inner gimbal member or table 16. An arrangement of pivots 61, 62 between the inner gimbal table 16 and the deck frame 14 allows the inner table 16 to rotate about two substantially horizontal axes. The loader arm 5 is pivotably connected to the inner gimbal member 16. The pivot axis of the loader arm 5 corresponds to the pivot axis defined by the pivots 61 between the inner gimbal member 16 and the outer gimbal member 15. The motion of the inner gimbal member 16 is controlled by four hydraulic cylinders 18 (see FIG. 3) so that the inner gimbal table 16 can be held stationary to a global origin as the vessel 1 rolls and pitches.

The pipeline 10 is laid through an opening at the centre of the inner gimbal table 16. The opening is provided with a first clamping member 20 for supporting the catenary weight of the pipeline 10 from the gimbal table 3. The first clamping member 20 is adapted for releasably holding an upper end of the pipeline 10 extending into the sea. The first clamping member 20 is adapted for supporting the weight of the pipeline 10. In this exemplary embodiment, the first clamping member 20 comprises a series of friction clamps. It is possible to access the gimbal table 3 to allow make up of FRPC couplings and attachment of strakes as each new pipe section 60 is attached to the pipeline 10.

The transitional phase of uprighting a new pipe section and transferring its motion pattern from the ship to the inner gimbal table 16 is often a complex issue. This exemplary embodiment allows the axis of gimbal of the table to be aligned to the axis of the next pipe section 60 on the deck. The loader arm 5 at this stage is linked to the roll and pitch motion of the ship 1. Thus at the pick-up point the only relative motion between the two equipment items is a rotation about the longitudinal axis which can easily be countered for in the design of the grabs of the loading arm 5. The active gimbal table 3 remains stationary with respect to pitch and roll of the vessel 1.

The friction clamps of the first clamping member 20 are mounted within the inner gimbal table 16, i.e. the first clamping member 20 has a substantially fixed position with respect to the pipeline 10. The term "substantially fixed position" must be understood as meaning that the first clamping member may be able to rotate in pitch and roll with respect to the pipeline in order to avoid bending the pipeline (when clamped and supporting the pipeline).

The subsea elevator unit 7 comprises a second clamping member 22 that can be moved between an upper position and a lower position by moving up and down the subsea elevator unit 7. In this exemplary embodiment, the movable clamping member 22 also has friction clamps. The movable second clamping member 22 is adapted for releasably holding the pipeline 10 extending into the sea. The movable second clamping member 22 is adapted for supporting the weight of the pipeline 10 when the pipeline 10 is released from the first clamping member 20.

Figure 4:
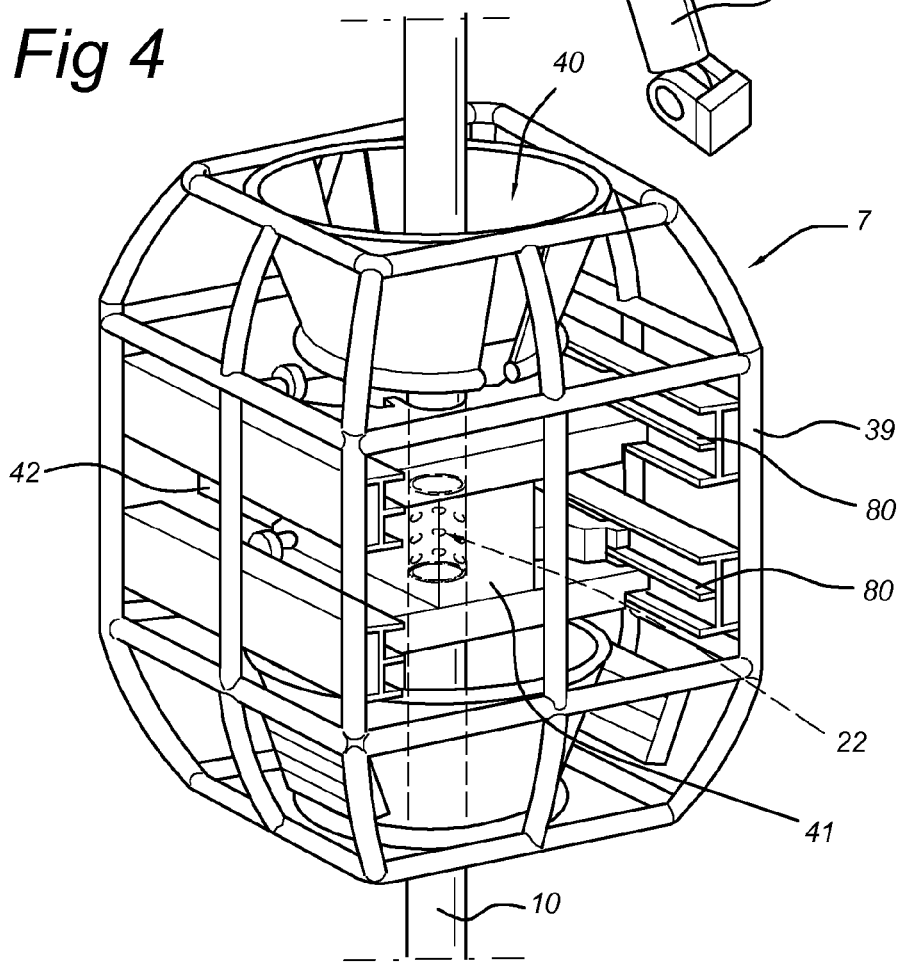
FIG. 4 shows a subsea elevator unit of the system shown in FIG. 1.

As shown in FIG. 4, the SSE system 7 comprises a frame 39 having a mouth 40 for receiving the pipeline 10. In this exemplary embodiment, the second clamping member 22 comprises two clamping blocks 41, 42 that are slidable with respect to guiding rails 80. The clamping blocks 41, 42 can be driven by clamp actuators (not shown) for engaging and disengaging the pipeline 10. The clamping blocks 41, 42 comprise friction clamps.

The friction clamps of the first and second clamping members 20, 22 are able to hold the pipeline catenary load by gripping the pipe coating when required. The friction clamps 21, 23 are controlled from a central control cabin in a logic based system with the subsea elevator 7. System interlocks are used to ensure that the pipe friction clamps 21, 23 can be only be released once the other set are engaged. Overall friction clamp length is, for example, approximately 2 m and is governed by the load carrying capacity of the pipe.

In the case of non-insulated pipe, the pipeline may be deployed hand-over-hand by clamping the first and second clamping members 20,22 onto an enlargement on the pipe such as a J-lay collar or connector collar (not shown). It is noted that clamping in this patent application is not limited to holding the pipeline on the basis of friction. Clamping may also mean other pipeline support.

The friction clamps of the first and second clamping members 20, 22 are mounted such that they can be removed. This allows the passage of a flexible joint or other large end termination down the centre of the firing line. An operational sequence of lowering a large end termination through the inner gimbal table is especially beneficial at the end of a lay operation where the product is required to be lowered under full catenary weight with the end fitting in place. The A&R system 9 can then take over the lowering operation as will be explained below.

At the start of the lay cycle, the large end termination passes through gimbal friction clamp 20, and is lowered by the main ships crane. The subsea elevator unit 7 grips the pipeline 10. A first half of the friction clamp is lowered onto a flange inside the inner gimbal ring 16. A docking position is forced. A second half of the friction clamp is assembled around the pipeline 10. Four locating studs assist in guiding the clamp into the correct position. The J-lay system 2 is now ready to commence normal lay operations.

Figure 5:
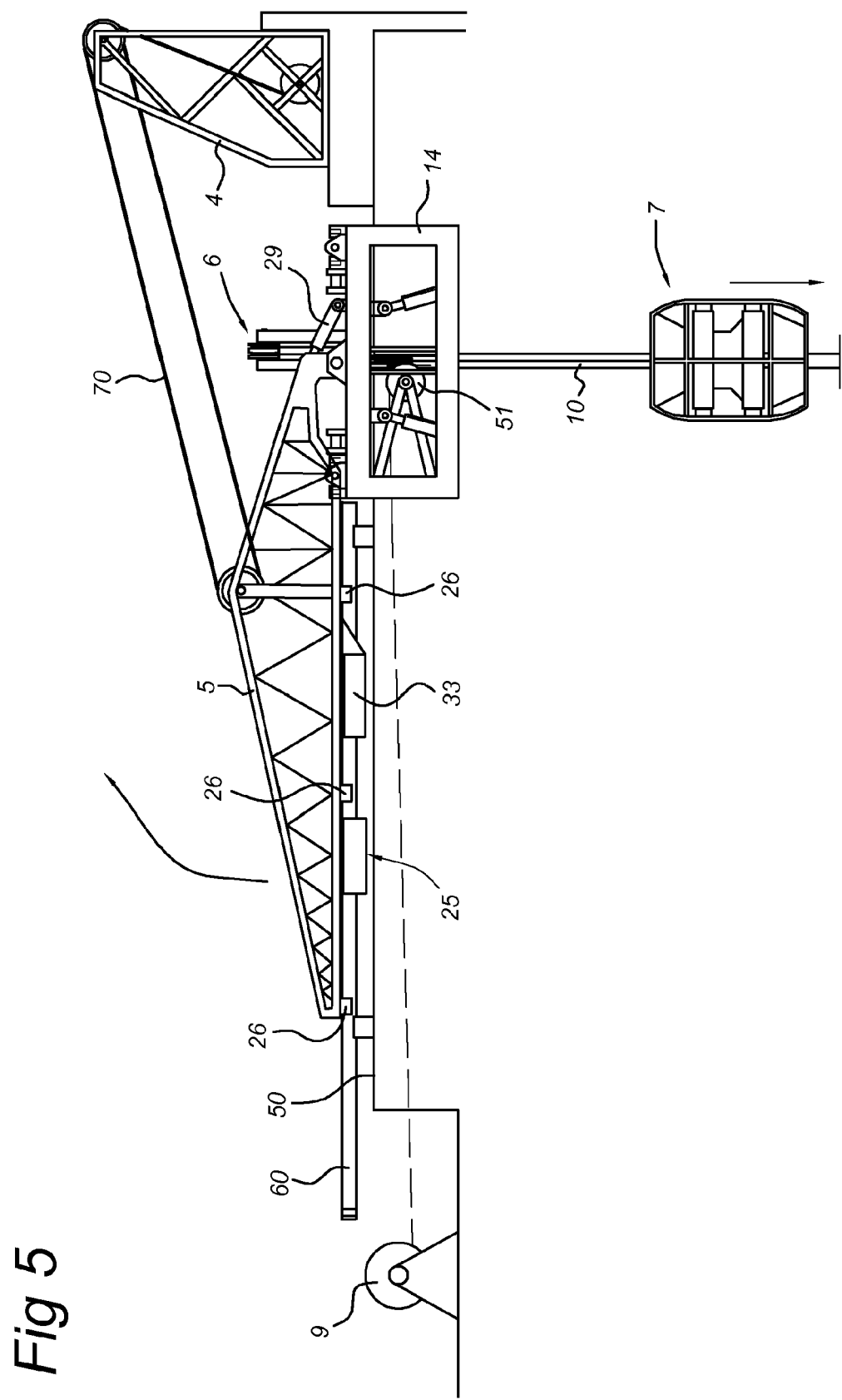
FIGS. 5-7 show the operation of the loader arm for connecting a pipe section to the offshore pipeline in the system shown in FIG. 1.
Figure 6:
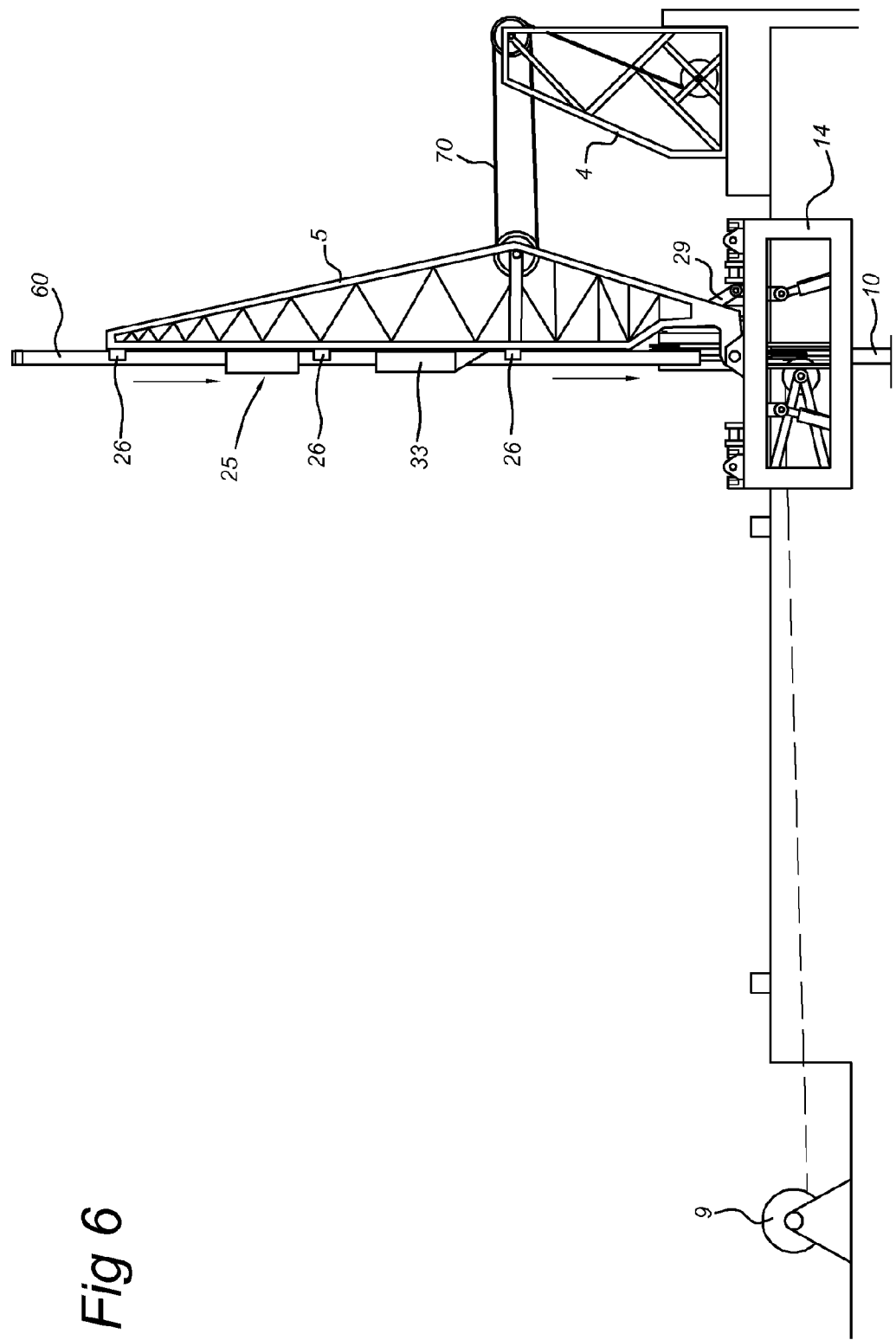
Figure 7:
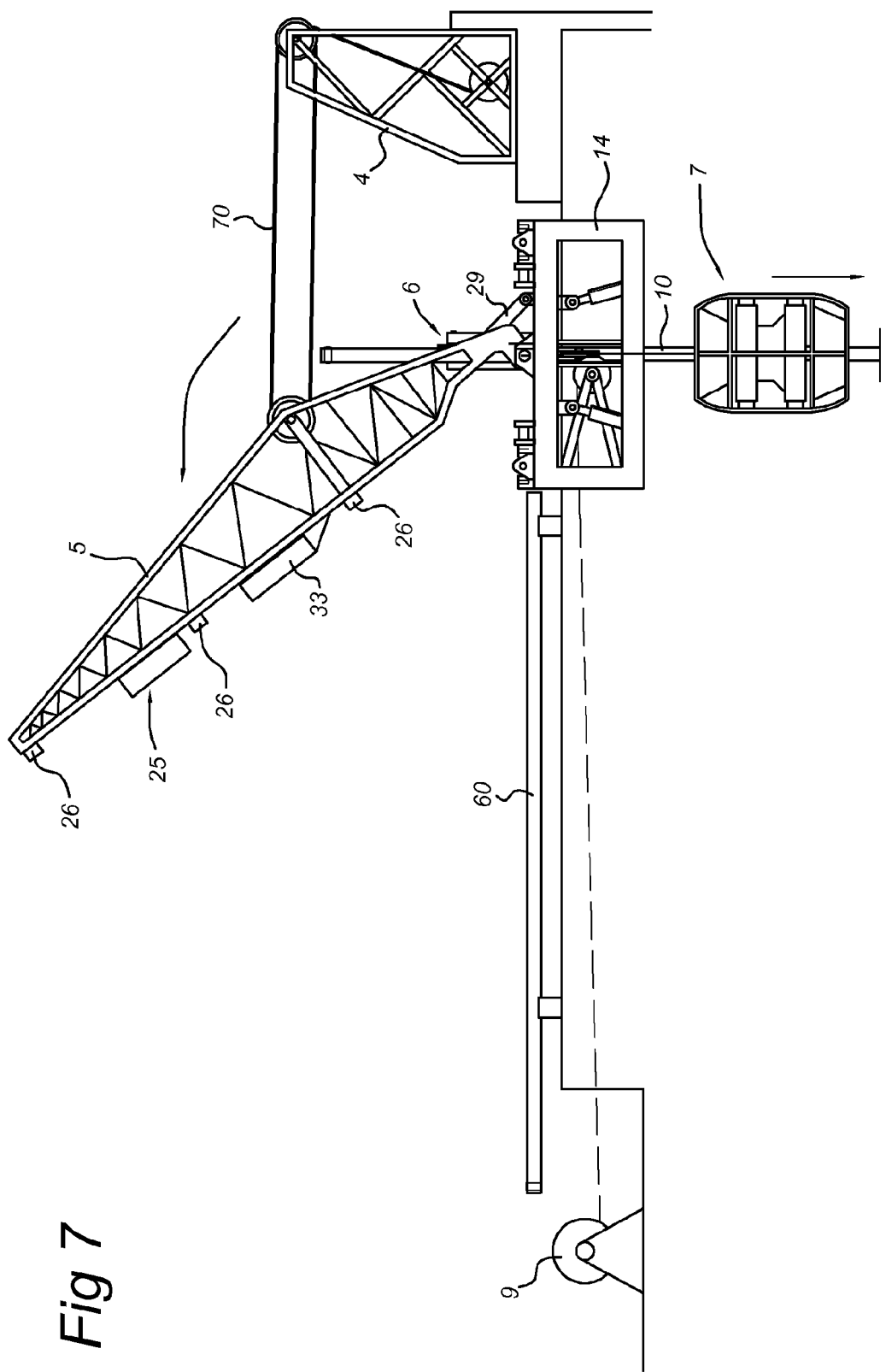

The J-lay operation is shown in more detail in FIGS. 5-7. The loader arm 5 comprises a pipe manipulation system 25 for manipulating a pipe section 60 loaded on the loader arm 5. The pipe manipulation system 25 of the loader arm 5 comprises pipe section grabs 26 and a pipe section lowering system 33. The deck handling equipment is adapted for placing the pipe section 60 in a suitable location for pick-up by the loader arm 5.

The winch tower 4 which is mounted on the deck of the vessel 1 controls a lifting wire 70 which is connected to the loader arm 5. FIG. 5 shows a pipe section 60 to be uprighted by the loader arm 5. In FIG. 6, the loader arm 5 is docked on the pick up station. In the horizontal loading position of the loader arm 5, the loader arm 5 picks up a pipe section 60 from the deck pipe handling system 8 (see FIG. 1). The pipe section 60 is gripped in the pipe section grabs 26 of the pipe manipulation system 25. Then, the winch tower 4 erects the loader arm 5 to upright the pipe section 60 engaged by the loader arm 5.

At approximately 10° from vertical the movement of the loader arm 5 is brought under the control of hydraulic actuators 29. The winches of the winch tower 4 enter a low tension render mode to keep control over the lifting wire 70. The hydraulic actuators 29 assist in soft docking of the loader arm 5. Under the control of the hydraulic actuators 29 the loader arm 5 is synchronised to the inner gimbal table 16 motions. Once the loader arm 5 is in the laying position the pipe jointing sequence can be initiated.

The pipe section grabs 26 have the facility to manipulate the loaded pipe section 60 in three planes to allow accurate mate-up of the FRPC's. Then, the pipe section 60 is lowered onto the pipeline 10 extending into the sea using the pipe section lowering system 33. The pipe section lowering system 33 is shown schematically in FIGS. 5-7 and may be constructed in various ways.

Redundancy in the arm lifting system is provided by dual winch and sheave systems in the winch tower 4 and dual hydraulic cylinders 29 for when the loader arm 5 is fully up-righted. The J-lay system 2 can accommodate up to a 10° rake angle on the pipeline 10 to allow shallower water operations.

After the lower end of the pipe section 60 rests on the upper end of the pipeline 10 extending into the sea, the pipe section 60 is attached to the pipeline 10, for example by welding. The pipeline 10 including the attached pipe section 60 is subsequently lowered through the moon-pool.

To improve the cycle time of the J-lay system 2 the loader arm 5 is allowed to commence its return cycle before the pipeline 10 is fully lowered through the moon-pool. Actuators drive the loader arm 5 onto the wires of the winch tower 4 for controlled lowering of the product loader arm. In this exemplary embodiment, the frame design allows the loader arm 5 to lower with 8 m pipe protruding from the moon pool. The loader arm 5 then returns to pick-up station. The pipe grabs 26 are opened and returned to pick-up position.

The pipeline 10 extended by the attached pipe section 60 is lowered using the first clamping member 20 mounted in the gimbal table 3 and the second clamping member 22 mounted in the subsea elevator (SSE) unit 7. Initially, the movable second clamping member 22 is in its upper position, and the first and second clamping members 20, 22 both clamp the pipeline 10.

Then, the first clamping member 20 of the gimbal table 3 is released and the SSE unit 7 is used to lower the pipeline 10 in preparation for the next jointing operation. It achieves this by allowing the subsea elevator unit 7 to descend for one pitch, together with the second clamping member 22 in its clamped position, to lower the pipeline 10 while gripping the pipeline 10. The hand-over-hand sequence is completed by activating the first clamping member 20 of the gimbal table 3, which allows the second clamping member 22 to be released and the SSE unit 7 to cycle back to the upper position.

The primary mechanical mover for the subsea elevator unit 7 is the lifting system 6, which in this exemplary embodiment comprises two sets of multi-fall sheave blocks connected to large hydraulic cylinders as well as lift cables connected to the subsea elevator unit 7 (see FIG. 1). The lifting system 6 may be constructed in various other ways. For example, the lifting system comprises redundant winch wire reeved through the subsea elevator unit 7 (not shown).

Under normal operating conditions the subsea elevator unit 7 only requires to be lowered under load. This operation requires a controlled throttling of the hydraulic flow in the cylinder full bore and hence can be made a relatively quick operation. The return speed of the subsea elevator unit 7 is governed by the low pressure flow rate to return the cylinders to their fully extended position; this operation can be completed in tandem with other operations and hence is not critical to the systems operational speed.

The subsea elevator unit 7 is designed to work in reverse to allow recovery of the pipe 10. The operational speed of this unusual operation is governed by the hydraulic power available to the system and pipe catenary weight being recovered. The subsea elevator unit 7 is capable of passing strakes between its clamping pads. For activation of the clamp when laying with strakes a plain section of pipe is required to allow the subsea elevator unit 7 to grip cleanly onto the pipeline 10.

The subsea elevator unit 7 is designed to be stored and docked high in the moon-pool during ship transits. This allows it to be accessed for maintenance from inside the moon-pool. It is fitted with manual ROV intervention valves to allow it to be freed from the pipe string 10 should it suffer a failure during operations.

In this exemplary embodiment, the equipment is capable of passing a 2.5 meter flexible joint through the centre of the clamp allowing for end terminations to be passed through the moon-pool in anticipation of hand-over to other vessels or the ocean floor.

The A&R system 9 is provided for termination and transfer of the completed pipeline or for situations when the pipe catenary load or static pipeline angle cannot be maintained with the J-lay equipment, such as pipeline flooding or storm conditions. In this exemplary embodiment, the A&R system 9 comprises a 500 t winch that is mounted on the aft main deck of the vessel 1. The wire is routed under the mezzanine deck 50 of the ship 1 onto a sheave wheel 51 placed in the firing line of the moon-pool. The A&R system 9 allows hand-over of the pipe catenary weight from the subsea elevator unit 7 to a wire rope that can lower the system in preparation for hand-over of the end termination to an FPSO or CALM buoy. The A&R central sheave is mounted to allow it be easily installed and removed from the firing line.

After the subsea elevator unit 7 lowers the pipe string 10 beneath the first clamping member 20 of the gimbal table 3, the A&R wire is attached to the pipe string 10 and the A&R sheave 51 is positioned over the moon pool firing line. Then, the 500 t winch positioned on the back deck takes the load from the subsea elevator unit 7, and the friction clamps of the second clamping member 22 mounted in the subsea elevator unit 7 release. The system is retracted to the moon pool, so that the system is free to operate the A&R procedure.

The J-lay system according to the invention has several advantages over a conventional system having a J-lay tower, for example: mobilised/de-mobilised quickly from a multi-purpose installation type vessel, low weight and cost, fast cycle times (in particular when combined with the use of non-welded pipe connectors), and reduction in laid pipe stresses through decoupling of pipe string from vessel motions.

Existing configurations of J-lay towers utilise large static mounted derricks mounted on the ships main deck. The J-lay system according to the invention differs e.g. in that the loader arm is a small structure that does not have to deal with the full pipe catenary weight during the lay operation. A smaller, light weight loader arm reduces the ship size required to mount the equipment and improves mobilisation activities. The pipe section is attached to the pipeline extending into the sea while it remains on the loader arm. The pipe section is attached to the pipeline directly from the loader arm. The pipe section is not transferred from the loader arm to a separate J-lay tower.

Also, the pipe catenary is held in a gimballed clamp. This allows the pipe string to be isolated from the ship pitch and roll motions. Pipe cyclic stress and strain is thus greatly reduced during the laying operation, especially during protracted operations. Furthermore, efficient mobilisation of the system is important in utilisation of the boat resource.

In the system according to the exemplary embodiment the equipment is capable of reversing the pipelay operation for pipeline recovery.

The equipment is designed to operate in the following range of sea-states: normal operation, wherein the equipment can lay pipe and perform lay operations as required, extreme abandonment, wherein the equipment can remain holding the pipe string until the weather abates and normal operation can recommence, and survival conditions, wherein the equipment is placed in a stored position so that it can weather a severe storm—no pipe is loaded into the equipment. The system 2 can survive reasonable single point failures.

The invention is not limited to the exemplary embodiments shown in the figures. The skilled person will readily realise that various modifications are possible within the scope of the invention.

The invention claimed is:

1. A system usable with a pipe laying vessel, comprising:
   a support frame of the vessel;
   a loader arm which is pivotable between a loading position and a laying position, the loader arm being provided with a pipe section manipulation system;
   a first clamping member having a fixed position with respect to the support frame, the first clamping member being operable between a clamped position for supporting the weight of a pipeline extending into the sea, and a released position for allowing the pipeline to be lowered with respect to the first clamping member, the first clamping member being rotatable in pitch and roll with respect to the pipeline when the first clamping member clamps the pipeline; and
   a second clamping member being movable between an upper position and a lower position, the second clamping member being operable between a clamped position for supporting the weight of the pipeline during movement from the upper position to the lower position, and a released position for moving the second clamping member from the lower position to the upper position,
   wherein the pipe manipulation system of the loader arm is adapted to manipulate a lower end of a pipe section which is loaded on the loader arm onto an upper end of the pipeline extending into the sea in the laying position of the loader arm, and
   wherein the movable second clamping member, in the upper and lower positions, is located below the first clamping member, and at least in the lower position, is located below sea level during operation.

2. The system according to claim 1, wherein the pipe manipulation system of the loader arm comprises a pipe section lowering device configured to lower the pipe section loaded in the loader arm in the laying position such that the lower end of said pipe section is mounted onto the upper end of the pipeline.

3. The system according to claim 1, further comprising a subsea elevator unit, which is provided with the second clamping member,
   wherein the subsea elevator unit is movable between an upper position and a lower position, the upper and lower positions of the subsea elevator unit being located below the first clamping member.

4. The system according to claim 1, wherein the first clamping member can be operated into the released position only when the second clamping member is in the clamped position, and wherein the second clamping member can be operated into the released position only when the first clamping member is in the clamped position.

5. The system according to claim 1, wherein the loader arm is pivotably connected to the support frame so as to be independent from sea-state induced vessel motions.

6. The system according to claim 1, wherein the support frame comprises a gimbal device having an outer gimbal member that is pivotable about a first pivot axis with respect to the support frame, and an inner gimbal member that is pivotable about a second pivot axis with respect to the outer gimbal member, the second pivot axis being perpendicular to the first pivot axis, and wherein the loader arm is pivotably connected to the inner gimbal member.

7. The system according to claim 6, wherein the loader arm is pivotable about the second pivot axis.

8. The system according to claim 7, wherein actuating means are pivotably connected between the inner gimbal member and the loader arm, the actuating means being adapted for adjusting the orientation of the loader arm with respect to the vertical direction in relation to the surface of the sea.

9. The system according to claim 7, wherein the inner gimbal member comprises a passage for the pipeline extending into the sea, and the first clamping member is mounted in said passage.

10. The system according to claim 6, wherein actuating means are pivotably connected between the inner gimbal member and the loader arm, the actuating means being adapted for adjusting the orientation of the loader arm with respect to the vertical direction in relation to the surface of the sea.

11. The system according to claim 10, wherein the inner gimbal member comprises a passage for the pipeline extending into the sea, and the first clamping member is mounted in said passage.

12. The system according to claim 6, wherein the inner gimbal member comprises a passage for the pipeline extending into the sea, and the first clamping member is mounted in said passage.

13. A vessel comprising a system according to claim 1.

14. The system according to claim 1, wherein the support frame is a deck frame of the vessel.

15. A method for installing a pipeline onto a sea bed, comprising:
- providing a support frame of a vessel;
- providing a pipeline extending into the sea, the pipeline having an upper end that is clamped by a first clamping member configured to support the weight of the pipeline;
- loading a pipe section onto a loader arm in a loading position, and holding said pipe section on the loader arm;
- pivoting the loader arm from the loading position to a laying position;
- manipulating the pipe section on the loader arm in the laying position such that the lower end of the pipe section is manipulated onto the upper end of the pipeline extending into the sea;
- attaching the lower end of the pipe section to the upper end of the pipeline so as to extend the pipeline extending into the sea by the pipe section;
- clamping the extended pipeline extending into the sea by a second clamping member in an upper position for supporting the weight of the extended pipeline;
- releasing the first clamping member; and
- moving the second clamping member from the upper position to a lower position, wherein the second clamping member moves from the upper position to the lower position below the first clamping member, and at least in the lower position, is located below sea level.

16. The method according to claim 15, wherein the first clamping member is operated to clamp the extended pipeline after the second clamping member has been moved to the lower position, and wherein the second clamping member is released after clamping the extended pipeline by the first clamping member, and the second clamping member is subsequently moved back from the lower position to the upper position.

17. The method according to claim 15, wherein the lower end of the pipe section, which has been loaded in the loader arm in the loading position, is connected to the upper end of the pipeline while said pipe section is being held by the loader arm in the laying position.

18. A system usable with a pipe laying vessel, comprising:
- a support frame of the vessel;
- a loader arm which is pivotable between a loading position and a laying position, the loader arm being provided with a pipe section manipulation system;
- a first clamping member having a fixed position with respect to the support frame, the first clamping member being operable between a clamped position for supporting the weight of a pipeline extending into the sea, and a released position for allowing the pipeline to be lowered with respect to the first clamping member; and
- a second clamping member being movable between an upper position and a lower position, the second clamping member being operable between a clamped position for supporting the weight of the pipeline during movement from the upper position to the lower position, and a released position for moving the second clamping member from the lower position to the upper position,
- wherein the pipe manipulation system of the loader arm is adapted to manipulate a lower end of a pipe section which is loaded on the loader arm onto an upper end of the pipeline extending into the sea in the laying position of the loader arm, and
- wherein the movable second clamping member, in the upper and lower positions, is located below the first clamping member, and at least in the lower position, is located below sea level during operation.

\* \* \* \* \*

UNITED STATES PATENT AND TRADEMARK OFFICE
CERTIFICATE OF CORRECTION

PATENT NO.      : 8,366,352 B2
APPLICATION NO. : 12/527073
DATED           : February 5, 2013
INVENTOR(S)     : Pollack et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this
First Day of September, 2015

Michelle K. Lee
*Director of the United States Patent and Trademark Office*